(12) United States Patent
Lerosey

(10) Patent No.: US 11,606,530 B2
(45) Date of Patent: Mar. 14, 2023

(54) DISPLAY DEVICE, TELEVISION SET OR COMPUTER MONITOR USING SUCH A DISPLAY DEVICE

(71) Applicants: GREENERWAVE, Valbonne (FR); CENTRE NATIONAL DE LA RECHERCHE SCIENTIFIQUE—CNRS, Paris (FR); ECOLE SUPÉRIEURE DE PHYSIQUE ET DE CHIMIE INDUSTRIELLES DE LA VILLE DE PARIS, Paris (FR)

(72) Inventor: Geoffroy Lerosey, Paris (FR)

(73) Assignees: GREENEWAVE, Valbonne (FR); CENTRE NATIONAL DE LA RECHERCHE SCIENTIFIQUE—CNRS, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 339 days.

(21) Appl. No.: 16/758,173

(22) PCT Filed: Oct. 19, 2018

(86) PCT No.: PCT/EP2018/078807
§ 371 (c)(1),
(2) Date: Apr. 22, 2020

(87) PCT Pub. No.: WO2019/081385
PCT Pub. Date: May 2, 2019

(65) Prior Publication Data
US 2020/0329210 A1 Oct. 15, 2020

(30) Foreign Application Priority Data
Oct. 25, 2017 (EP) .................................... 17306467

(51) Int. Cl.
*H04N 5/64* (2006.01)
*H01Q 1/24* (2006.01)
(Continued)

(52) U.S. Cl.
CPC ................. *H04N 5/64* (2013.01); *H01Q 1/24* (2013.01); *H01Q 3/44* (2013.01); *H04N 5/38* (2013.01); *H04N 5/44* (2013.01)

(58) Field of Classification Search
CPC .. H04N 5/64; H04N 5/38; H04N 5/44; H01Q 1/24; H01Q 3/44; H01Q 3/446
See application file for complete search history.

(56) References Cited

U.S. PATENT DOCUMENTS

| 6,538,621 B1 | 3/2003 | Sievenpiper et al. |
| 7,245,269 B2 | 7/2007 | Sievenpiper et al. |

(Continued)

FOREIGN PATENT DOCUMENTS

| JP | 2007-143044 A | 6/2007 |
| JP | 2013-131808 A | 7/2013 |

(Continued)

OTHER PUBLICATIONS

Georgiadis, A. et al., "Patents on Reconfigurable Reflectarray Antennas", Recent Advances in Electrical & Electronic Engineering, 2(1): 19-26, Jan. 2010.

(Continued)

*Primary Examiner* — John W Miller
*Assistant Examiner* — Humam M Satti
(74) *Attorney, Agent, or Firm* — Nixon & Vanderhye

(57) ABSTRACT

Disclosed is a display device including, from a front face towards a rear face, a panel, a ground plane, and a processing unit connected to the panel and including an antenna for receiving and/or emitting a wave for connection to a wireless network. The display device further includes a plurality (Continued)

of adjustable elements connected to the processing unit, each adjustable element having an impedance which can be modified by the processing unit in order to change the manner in which the wave is reflected and/or transmitted by the adjustable elements, these adjustable elements being located on the rear side of the ground plane.

20 Claims, 1 Drawing Sheet

(51) Int. Cl.
  *H01Q 3/44* (2006.01)
  *H04N 5/38* (2006.01)
  *H04N 5/44* (2011.01)

(56) References Cited

U.S. PATENT DOCUMENTS

| | | | |
|---|---|---|---|
| 9,941,574 B2* | 4/2018 | Hotta | .................. H01Q 1/42 |
| 2005/0179614 A1 | 8/2005 | Nagy | |
| 2011/0244786 A1 | 10/2011 | Fujii et al. | |
| 2014/0125548 A1* | 5/2014 | Jouanlanne | .............. H01Q 7/00 |
| | | | 343/867 |
| 2016/0233971 A1 | 8/2016 | Fink et al. | |
| 2019/0140705 A1* | 5/2019 | Ramasamy | .............. H04B 7/04 |

FOREIGN PATENT DOCUMENTS

| | | | |
|---|---|---|---|
| JP | 2013131808 A | * | 7/2013 |
| WO | 2015/039769 A1 | | 3/2015 |

OTHER PUBLICATIONS

Subrt, L. et al., "Controlling propagation environments using Intelligent Walls", 2012 6th European Conference on Antennas and Propagation (EUCAP), Mar. 26-30, 2012.

Subrt, L. et al., "Intelligent walls as autonomous parts of smart indoor environments", IET Communications (vol. 6, Issue: 8 ), pp. 1004-1010, May 22, 2012.

International Search Report, dated Jan. 23, 2019, from corresponding PCT application No. PCT/EP2018/078807.

* cited by examiner

DISPLAY DEVICE, TELEVISION SET OR COMPUTER MONITOR USING SUCH A DISPLAY DEVICE

TECHNICAL FIELD

The present invention relates to a display device, for example a television set or a computer monitor.

STATE OF THE PRIOR ART

More particularly, the invention relates to a display device comprising:
- a panel suitable for generating a visible display on the front face,
- a ground plane suitable for protecting the panel from the electromagnetic environment, and
- a processing unit connected to the panel in order to control the panel display, said processing unit comprising an antenna for receiving and/or emitting a wave for connection to a wireless network which supplies the processing unit with a stream of data intended for controlling the display.

In this type of display device, the ground plane protects the panel from the electromagnetic environment in order to ensure the quality of the display, in other words to maintain a constant and uniform brightness and/or contrast over the entire surface of the panel. However, this ground plane disrupts the reception and emission of the wave at the antenna, which reduces the speed of the wireless connection.

This problem can be reduced by using a more efficient (more sensitive) antenna, such as an antenna comprising several active antenna elements using multi-input multi-output (MIMO) transmission. However, the speed remains reduced compared to a display device without a ground plane.

In addition, display devices are increasingly being placed close to a wall. The antenna is then located between the ground plane of the display device and the wall. This arrangement further reduces the speed of the wireless connection of the display device.

STATEMENT OF THE INVENTION

An object of the present invention is to improve display devices with wireless connections of this type, in particular to improve the speed during antenna reception and/or emission.

For this purpose, the display device further comprises a plurality of adjustable elements connected to the processing unit, each adjustable element having an impedance which can be modified by the processing unit in order to change the manner in which the wave is reflected and/or transmitted by the adjustable element, these adjustable elements being located on the rear side of the ground plane.

With these arrangements, the display device is able to modify adjustment parameters of the adjustable elements, and can modify and optimize its reception and/or emission of the wave of its antenna.

The display device can thus improve the reception and/or emission speed of the antenna. In this manner, the processing unit can process a data stream intended for display on the panel, correctly and in particular in real time. Optionally, the processing unit can interact with the supplier of the data stream in order to obtain a data stream with, for example, better image and/or video resolution, which greatly improves the quality of the display.

In various embodiments of the display device according to the invention, one or more of the following arrangements may possibly be used.

According to one aspect, the ground plane comprises an outer contour and the adjustable elements are positioned on one or more edges of the outer contour of the ground plane.

According to one aspect, the ground plane comprises an outer contour and the adjustable elements are positioned along the entire outer contour of the ground plane.

According to one aspect, the adjustable elements are installed on the ground plane and the adjustable elements are connected to the ground plane.

According to one aspect, adjustable elements are interconnected as a group and the group is directly connected to the processing unit.

According to one aspect, at least two elements of the group are placed on opposite edges of the outer contour of the ground plane.

According to one aspect, the processing unit determines adjustment parameters for the plurality of adjustable elements in order to optimize reception of the wave by the antenna.

According to one aspect, the optimization concerns an estimation of the reception level and/or an estimation of the reception quality.

According to one aspect, the optimization also uses the reception of the wave emitted by the antenna and received by an accessory device connected to the wireless network.

According to one aspect, the optimization minimizes the reception of another wave from another wireless network.

Another object of the invention is to provide a television set comprising a display device of the abovementioned type and suitable for displaying a stream of broadcast video data from a television channel.

Another object of the invention is to provide a computer monitor comprising a display device of the abovementioned type and suitable for displaying a stream of data corresponding to an image coming from a computer.

BRIEF DESCRIPTION OF DRAWINGS

Other features and advantages of the invention will become apparent during the following description of one of its embodiments, given as a non-limiting example, with reference to the accompanying drawings.

In the drawings.

In the various figures, the same reference numbers designate identical or similar elements.

DETAILED DESCRIPTION

Figure 1:
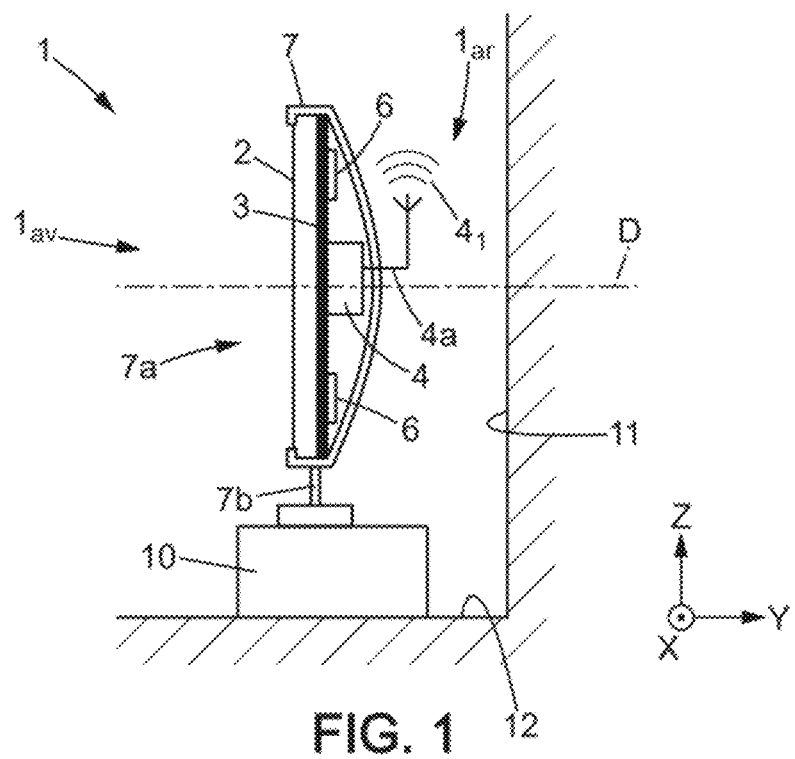
FIG. 1 is a section view of a display device according to the invention.

FIG. 1 is a simplified section view of a display device 1 according to the invention.

Display device 1 is understood to mean any type of screen, such as a television set or a computer monitor or the like.

The display device 1 comprises a front face $1_{av}$ and a rear face $1_{ar}$, the front and rear faces being opposite one another, in the figures the front face being directed in the negative Y direction and the rear face being directed in the positive Y direction. In general, an element is designated as being located in front of another element if it is located in the negative Y direction in relation to that other element. Conversely, an element is designated as being located behind another element if it is located in the Y direction in relation to that other element.

The display device 1 comprises:
- a panel 2 located in the front face $1_{av}$ and suitable for generating a visible display on said front face,
- a ground plane 3 located behind the panel 2 and suitable for protecting the panel 2 from the electromagnetic environment, and
- a processing unit 4 located behind the ground plane 3 and connected to the panel 2 in order to control the panel display.

The panel 2 may be of various types. For example, the panel 2 is of a type such as:
- liquid crystal (LCD),
- liquid crystal with backlighting by light-emitting diodes (LCD LED or LED),
- organic light-emitting diodes (OLED),
- active matrix with organic light-emitting diodes (AMOLED),
- quantum dot and liquid crystal (QLED),
- etc.

The panel 2 has a generally flat or slightly curved shape. It is thin, of low thickness, for example less than 5 mm and preferably less than 3 mm.

The panel 2 often has a large diagonal dimension. In this technical field the diagonal dimension is expressed in inches. Its diagonal dimension is for example greater than 32 inches, or greater than 40 inches, or even greater than 50 inches. In fact, the larger the diagonal dimension, the more the display device will have difficulty obtaining good speed over a wireless connection.

In addition, the processing unit 4 comprises an antenna 4a for receiving and/or emitting a wave $4_1$ for connection to a wireless network which supplies the processing unit 4 with a stream of data intended for controlling the display.

In addition, the processing unit 4 comprises one or more connectors 4b for a wired connection to the network or to a source of signals and/or data for controlling the display.

This processing unit 4 comprises for example for its operation a power supply, a microprocessor, and memory. The processing unit 4 may be connected to the ground plane 3 to improve its protective effect.

Ground plane 3 is understood to mean any electrically conductive surface, such as a metal sheet or plate or a plate covered with an electrically conductive layer. This ground plane mostly or entirely covers the rear of the panel 2. In particular, it is considered that this ground plane covers at least 80% of the rear surface area of the panel 2, and preferably at least 95% of this rear surface area.

The display device 1 possibly comprises a housing 7. The panel 2, the ground plane 3, and the processing unit 4 are advantageously located in the housing 7. This housing comprises an opening 7a in the front face so that panel 2 is visible from the front face. The antenna 4a optionally extends outside the housing 7 on the rear, as can be seen in FIG. 1. In addition, the housing 7 may comprise towards the bottom (negative Z direction) a base 7b suitable for placement on the ground 12 or on furniture 10. The display device 1 is also often placed close to a wall 11, its rear face $1_{ar}$ facing said wall 11 and its front face $1_{av}$ facing a room.

The display device 1 according to the invention further comprises a plurality of adjustable elements 6 connected to the processing unit 4, each adjustable element having an impedance which can be modified by the processing unit to change the manner in which the wave is reflected and/or transmitted by the adjustable elements, these adjustable elements 6 being located on the rear side of the ground plane 3, in other words on the rear face $1_{ar}$ side of the display device 1.

The plurality of adjustable elements 6 comprises at least two adjustable elements and preferably at least ten adjustable elements. The processing unit can thus act on the wave $4_1$ more easily.

Adjustable elements 6 is understood to mean any type of adjustable elements suitable for modifying the manner in which the wave is reflected and/or transmitted by the adjustable elements.

According to a first example, U.S. Pat. No. 6,538,621 shows an example of an electromagnetic surface whose impedance is tunable or modifiable. This electromagnetic surface comprises a plurality of resonant elements, each resonant element being adjustable. The electromagnetic surface of this document comprises plate elements located at a distance from a ground plane, the neighboring plate elements being connected together by a variable capacitor, each variable capacitor being able to be controlled by a control voltage. The impedance of the electromagnetic surface is thus modified, for example to focus the reflected wave or to give a spatial direction to the reflected wave 42. Optionally, the electromagnetic surface is composed of a plurality of cells, each cell comprising two different resonant elements.

According to a second example, patent document no. WO 2015/039769 cites and shows other types of resonant elements which can be used in an electromagnetic surface with tunable impedance:
- a variable diode can replace the variable capacitor,
- the resonant elements can be of a single polarization type or of two polarization types, possibly distributed over the surface in alternation,
- the resonant elements have one or more resonant frequencies for controlling a predetermined frequency band,
- the resonant elements are binary elements with two states, for example defined by a phase shift or amplitude shift of the modified wave.

Many variants of known resonant elements may be used to form adjustable elements of an electromagnetic surface with tunable impedance.

Figure 2:
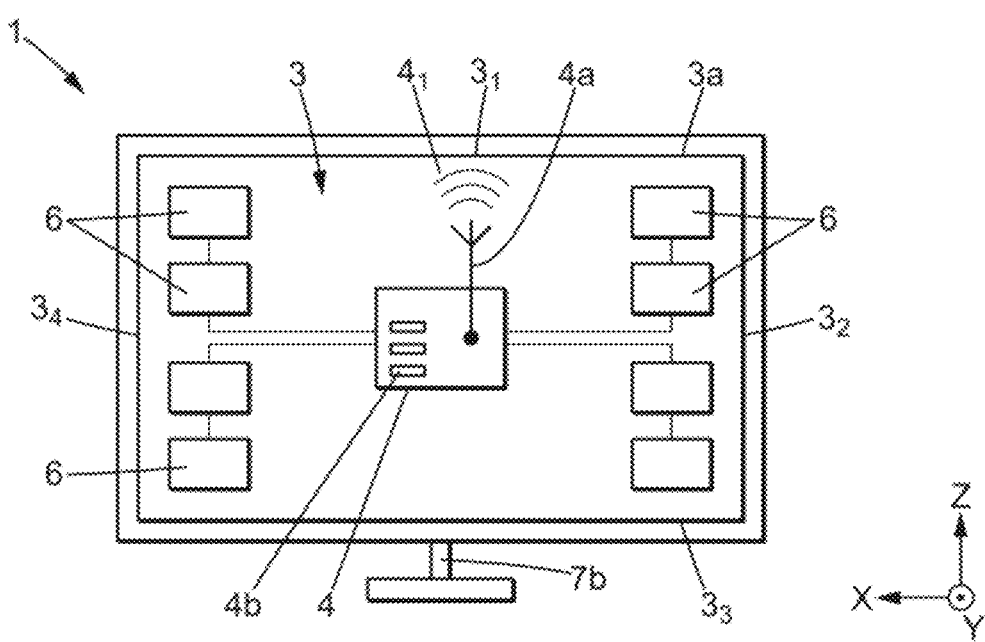
FIG. 2 is a rear view of the display device of FIG. 1.

FIG. 2 is a rear view of the display device 1 without the housing 7, which allows a clear view of at least the ground plane 3, the processing unit 4, and the adjustable elements 6.

The ground plane 3 comprises an outer contour 3a, visible in this FIG. 2. This outer contour 3a is the perimeter of the shape of the ground plane. This outer contour 3a has one or more edges $3_1$, $3_2$, $3_3$, $3_4$.

As represented and as is conventional, the panel 2 and the ground plane 3 have a rectangular shape. The edges $3_1$, $3_2$, $3_3$, $3_4$ are the four sides of the rectangular shape.

The adjustable elements 6 are positioned inside the outer contour 3a and advantageously near one or more of the edges of the outer contour.

For example, the adjustable elements 6 are positioned on two opposite edges $3_2$, $3_4$ of the outer contour 3, as shown in FIG. 2.

For example, the adjustable elements 6 are positioned on the four edges $3_1$, $3_2$, $3_3$, $3_4$.

For example, the adjustable elements 6 are positioned in the corners of the outer contour 3. In the case of the rectangular shape of FIG. 2, the adjustable elements 6 are then positioned near the vertices of consecutive edges.

In this manner, the adjustable elements 6 capture waves from the external environment of the display device 1, and they have more effect for the reception and/or emission of the wave by the antenna 4a.

According to some alternatives, several adjustable elements 6 are interconnected in a group, and the group is connected directly to the processing unit 4. There may be several (two or more) groups grouping together two or more adjustable elements 6. The connections to the processing unit are thus simplified.

The adjustable elements 6 of each group may be controlled independently of one another with an adjustment parameter for each adjustable element, or identically with a single adjustment parameter, which reduces the number of adjustment parameters.

Optionally, two adjustable elements 6 of a group are placed on opposite edges of the outer contour 3 of the ground plane 3.

The adjustable elements 6 are optionally installed on the ground plane 3, for example by an adhesive. In addition, the adjustable elements 6 may be electrically connected to the ground plane 3.

The state of the adjustable elements 6 is defined by a set of parameters defined by the processing unit 4 of the display device.

The processing unit 4 of the display device controls, for example, all the adjustable elements (for example, variable diode or capacitor), which makes it possible to modify its impedance. This modification is much more complex than spatial directivity or focusing. It modifies the spatial distribution of the radio wave in an area around the display device.

The processing unit 4 also monitors the wave received by the antenna 4a: for example, it determines reception information concerning the reception of the wave by its antenna 4a, this reception information being for example the reception level and/or the reception quality.

Conversely, the processing unit 4 receives, via the data stream from the wireless connection, emission information concerning the wave it itself emitted and then received by another device or accessory device of the wireless network.

The processing unit 4 then uses the reception information and/or emission information to estimate a value to be optimized, this value being part of the information or a combination of this information.

The processing unit 4 executes, for example, an optimization algorithm based on the set of (temporally) previous parameters, previous estimated values, and the current estimated value.

The optimization algorithm may be a maximization or a minimization of the estimated value, depending on the quantity represented by this value. In one or more successive steps, the optimization algorithm makes it possible to obtain an optimal set of parameters. At each step or with predetermined periodicities, the processing unit 4 applies the new set of parameters to the adjustable elements 6 and/or determines reception and/or emission information for carrying out the next iteration.

The optimal set of parameters makes it possible, for example, to improve the level of reception of the wave at the antenna 4a. Thanks to this modification by the optimized state of the adjustable elements 6 (modification of the electromagnetic impedance of the adjustable elements 6), the wave propagation field is improved towards the antenna 4a, and the speed of the data stream is increased.

Thus, the processing unit 4 determines the set of parameters for adjusting the plurality of adjustable elements 6, for example in order to optimize the reception of the wave $4_1$ by the antenna 4a. The optimization concerns the estimated value, which is for example an estimate of the wave reception level and/or reception quality by the antenna 4a.

According to one embodiment, the processing unit 4 comprises a memory which stores one or more optimal sets of parameters corresponding to a wireless network. In this manner, the optimization algorithm can start its process based on one or more of the saved sets of parameters, which saves time in the optimization and avoids transient effects from modifying (increasing) the throughput at start-up and therefore avoids variations in quality on the display.

According to one embodiment, the optimization algorithm monitors its performance and stops its optimization iterations when a stop criterion is reached. Variations in display quality can thus be avoided.

Optionally, the wireless network uses several independent channels of said network to transmit the data stream. The optimization may change (increase or decrease) the number of channels used for the data stream. In particular, when reception of the wave $4_1$ by the antenna 4a is improved, the processing unit 4 can increase the number of channels. When reception has deteriorated, the processing unit 4 can reduce the number of channels. As is known, the channels are for example distributed in a plurality of frequencies of the wireless network bandwidth.

Optionally, the optimization relates to emission information: in other words the reception of the wave emitted by the antenna 4a and received by another accessory device connected to the wireless network. Optionally, the optimization achieves a compromise between reception and emission, by calculating a value which is a combination of the reception information and emission information as already mentioned.

Optionally, in addition to optimization of the reception of the wave $4_1$ by the antenna 4a (improvement in the reception level or reception quality), the optimization also concerns a minimization of the reception of another wave from another wireless network. In this manner, the adjustable elements 6 of the display device 1 make it possible to reduce the reception of one or more other wireless networks (for example a neighbor's wireless network) while preserving and/or improving the reception of the wireless network comprising the stream of data intended for display on the display device 1.

Finally, an antenna 4a may comprise several active antenna elements with multi-input multi-output (MIMO) transmission. The reception of such an antenna may also be optimized by the arrangements described above.

Thus, by means of the adjustable elements 6 controlled to optimize the reception of the antenna 4a, the disadvantage of the ground plane 3 on the back (rear) of the panel 2 of the display device 1 is removed so that the device display 1 simultaneously maintains high display quality and high data throughput over its wireless connection.

The invention claimed is:

1. A display device, comprising, from a front face towards a rear face:
   a display panel that generates a visible display on the front face;
   a ground plane that protects the display panel from the electromagnetic environment;
   a processing unit connected to the display panel and configured to control the visible display of the display panel, the processing unit comprising an antenna that at least one of receives and transmits radio waves for connecting the display device to a wireless network which supplies the processing unit with a stream of data for producing images or video on the display of the display panel; and
   a plurality of adjustable elements located on the rear side of the ground plane and in connection with the processing unit, each adjustable element having an impedance that is modifiable by the processing unit, wherein the processing unit is configured to modify the impedance of each adjustable element to change a manner in which the radio waves are reflected and/or transmitted by the adjustable elements.

2. The device according to claim 1, wherein the ground plane comprises an outer contour and the adjustable elements are positioned on one or more edges of the outer contour of the ground plane.

3. The device according to claim 1, wherein the ground plane comprises an outer contour and the adjustable elements are positioned along an entirety of the outer contour of the ground plane.

4. The device according to claim 1, wherein the adjustable elements are installed on the ground plane and the adjustable elements are connected to the ground plane.

5. The device according to claim 1, wherein the adjustable elements are interconnected as a group, and the group is directly connected to the processing unit.

6. The device according to claim 5, wherein at least two elements of the group are placed on opposite edges of the outer contour of the ground plane.

7. The device according to claim 1, wherein the processing unit determines adjustment parameters for the plurality of adjustable elements in order to optimize reception of the waves by the antenna.

8. The device according to claim 7, wherein in determining the adjustment parameters, the processing unit estimates a reception level and/or a reception quality.

9. The device according to claim 7, wherein in determining the adjustment parameters, the processing unit uses the reception of the waves emitted by the antenna and received by an accessory device connected to the wireless network.

10. The device according to claim 7, wherein the optimization minimizes reception of waves from another wireless network.

11. A television set comprising a display device according to claim 1, configured to display a stream of broadcast video data from a television channel.

12. A computer monitor comprising a display device according to claim 1, configured to display a stream of data corresponding to an image coming from a computer.

13. The device according to claim 2, wherein the ground plane comprises an outer contour and the adjustable elements are positioned along an entirety of the outer contour of the ground plane.

14. The device according to claim 2, wherein the adjustable elements are installed on the ground plane and the adjustable elements are connected to the ground plane.

15. The device according to claim 3, wherein the adjustable elements are installed on the ground plane and the adjustable elements are connected to the ground plane.

16. The device according to claim 2, wherein the adjustable elements are interconnected as a group, and the group is directly connected to the processing unit.

17. The device according to claim 3, wherein the adjustable elements are interconnected as a group, and the group is directly connected to the processing unit.

18. The device according to claim 4, wherein the adjustable elements are interconnected as a group, and the group is directly connected to the processing unit.

19. The device according to claim 2, wherein the processing unit determines adjustment parameters for the plurality of adjustable elements in order to optimize reception of the waves by the antenna.

20. The device according to claim 3, wherein the processing unit determines adjustment parameters for the plurality of adjustable elements in order to optimize reception of the waves by the antenna.

* * * * *